US012689118B2

(12) United States Patent
Mayer Pujadas et al.

(10) Patent No.: US 12,689,118 B2
(45) Date of Patent: Jul. 21, 2026

(54) RADOME FOR VEHICLES AND METHOD FOR MANUFACTURING SAID RADOME FOR VEHICLES

(71) Applicant: Zanini Auto Grup, S.A., Parets del Vallès (ES)

(72) Inventors: Augusto Mayer Pujadas, Parets del Vallès Barcelona (ES); Jordi Martos Aragonés, Parets del Vallès Barcelona (ES); Albert Puigferrat Pérez, Parets del Vallès Barcelona (ES)

(73) Assignee: Zanini Auto Grup, S.A., Parets del Vallès (ES)

( * ) Notice: Subject to any disclaimer, the term of this patent is extended or adjusted under 35 U.S.C. 154(b) by 19 days.

(21) Appl. No.: 18/641,494

(22) Filed: Apr. 22, 2024

(65) Prior Publication Data

US 2024/0356206 A1     Oct. 24, 2024

(30) Foreign Application Priority Data

Apr. 21, 2023     (EP) ..................................... 23382380

(51) Int. Cl.
| | |
|---|---|
| *H01Q 1/02* | (2006.01) |
| *B29C 45/14* | (2006.01) |
| *B29K 75/00* | (2006.01) |
| *B29L 31/34* | (2006.01) |
| *H01Q 1/32* | (2006.01) |
| *H01Q 1/42* | (2006.01) |

(52) U.S. Cl.
CPC ................. *H01Q 1/42* (2013.01); *H01Q 1/02* (2013.01); *H01Q 1/32* (2013.01); *B29C 45/14508* (2013.01); *B29K 2075/00* (2013.01); *B29L 2031/3456* (2013.01)

(58) Field of Classification Search
None
See application file for complete search history.

(56) References Cited

U.S. PATENT DOCUMENTS

| | | | |
|---|---|---|---|
| 2014/0093665 A1 | 4/2014 | Horibe et al. | |
| 2018/0215086 A1 | 8/2018 | Geise | |
| 2022/0384940 A1* | 12/2022 | Caruso | H01Q 1/422 |

FOREIGN PATENT DOCUMENTS

| | | |
|---|---|---|
| DE | 10156699 | 6/2003 |
| EP | 0557612 | 10/2001 |

(Continued)

OTHER PUBLICATIONS

European Search Report and the European Search Opinion Dated Oct. 5, 2023 From the European Patent Office Re. Application No. 23382380.6. (14 Pages).

(Continued)

*Primary Examiner* — Laura C Powers

(57) ABSTRACT

The radome (1) for vehicles comprises a first part (8) comprising a transparent layer (11) and at least one decoration layer (5, 6), a second part (10), and an intermediate part (9) placed between the first and second parts (8, 10), the intermediate part (9) being made from a thermoset compound.

The method for manufacturing said radome comprises the following steps: inserting both the first and second parts (8, 10) in a mold; and injecting a thermoset compound between them for forming the intermediate part (9).

It permits to provide a radome for vehicles with a better RF performance.

6 Claims, 3 Drawing Sheets

(56)                     References Cited

FOREIGN PATENT DOCUMENTS

| EP | 4124880 | 2/2023 | |
|----|---------|--------|---|
| JP | 2022-029168 | 2/2022 | |
| WO | WO-2007021611 A1 * | 2/2007 | .............. H01Q 1/42 |

OTHER PUBLICATIONS

Grande et al. Resin Transfer Molding—An Overview: Multifunctionality of Polymer Composites 2015, ScienceDirect Topics, XP055871845, p. 1-10, Jun. 1, 2018.

* cited by examiner

RADOME FOR VEHICLES AND METHOD FOR MANUFACTURING SAID RADOME FOR VEHICLES

RELATED APPLICATIONS

This application is a Paris Convention Patent Application which claims the benefit of priority of Europe Patent Application No. 23382380.6 filed on Apr. 21, 2023. The contents of the above applications are all incorporated by reference as if fully set forth herein in their entirety.

FIELD AND BACKGROUND OF THE INVENTION

The present invention relates to a radome for vehicles and to a method for manufacturing said radome for vehicles.

Radomes in automotive applications usually have the challenge of combining aesthetic and functional requirements.

The aesthetic requirements derive from the need of representing the car manufacturer's logo in a very visible location like the front grille of the car. This emblem is commonly represented by the contrast between metal looking areas and dark colored areas.

The functional requirements are associated to the restrictive radiofrequency (RF) transmission limits required by evolving generations of radars. It is increasingly required to operate at adverse weather conditions, integrating, in many cases, a heating capability to remove snow or ice from the front face.

The combination of aesthetic and functional requirements is, in many cases, solved by two different parts. The front one provides the desired visual appearance. The rear one usually has mechanical functionalities like the fixation to the grille or the heating and/or lighting through some electrical connection on its rear side.

Both parts may be joined adding a third material or not and leaving, in some cases, an air gap between them. The existence of an air gap in the middle, which have a significantly different dielectric constant when compared to the ones of the plastic materials, may cause additional reflections of the radar waves, decreasing the transmission performance that the radome is able to provide.

U.S. Pat. No. 11,276,919 B2 of the same applicant of the present application discloses a radome that reduces this effect by including some welding segments in the field of view in order to reduce the variability and the dimension of this mentioned air gap.

DE 101 56 699 B4 is an example of joining both parts by adding an intermediate component where a plastic with comparable physical and chemical properties than the ones of the front and rear part is molded in the space existing between both parts. However, it does not solve the damage on the appearance of the decoration usually present on the rear face of the front part. This damage is caused by the high temperature and high pressure that is required to directly mold an intermediate thermoplastic layer. Additionally, the thermoplastic materials show poor adhesion to the metals and metalloids used to create the metal looking areas.

Mentioned problems are addressed by the inclusion of additional material layers between the decoration layer and the plastic to be injected.

One of these solutions is shown in EP 4 124 880 A1, of the same applicant, which discloses a radome where an adhesion promoter layer and, optionally, an ink layer are required to be applied to the decoration layer. This increases the adhesion of the molded thermoplastic part to the decoration and increases the protection of the decoration in front of the high temperature and pressure associated to the injection of the thermoplastic material. However, it complicates the process.

SUMMARY OF THE INVENTION

Therefore, an objective of the present invention is to provide a radome for vehicles with a better RF performance and a method for its manufacture.

With the radome for vehicles and the method according to the present invention, the aforementioned drawbacks are resolved, presenting other advantages that will be described below.

The radome for vehicles according to the present invention and its manufacturing method are defined in the correspondent independent claims. Additional optional features are included in the dependent claims.

In particular, the radome for vehicles comprises:
a first part comprising a transparent layer and at least one decoration layer;
a second part; and
an intermediate part placed between the first and second parts, said intermediate part being made from a thermoset compound.

The thermoset compound is preferably polyurethane resin or polyurea resin.

Furthermore, the radome defines a field of view in the first, second and intermediate parts, the intermediate part being in contact with the first and second parts at least in said field of view, leaving no gap of air between them.

Preferably, the thickness of the intermediate part in its part has a minimum thickness greater than 0.1 mm.

According to a possible embodiment, the intermediate part comprises intermediate protrusions with a thickness greater than the rest of the intermediate part, and/or the transparent layer comprises depressions. Furthermore, the second part can comprise rear protrusions complementary with the depressions of the transparent layer.

The first part can also comprise a protective layer, preferably made from a thermoset compound, such as polyurethane or polyurea thermoset resin.

The method for manufacturing a radome for vehicles comprises the following steps:
inserting both the first and second parts in a mold; and
injecting a thermoset compound between them for forming the intermediate part.

Preferably, the injection of the thermoset compound is carried out at a temperature lower than 100° C. and/or at a pressure between lower that 40 MPa.

According to a possible embodiment, a thermoset compound is injected in the mold for forming a protective layer in the first part.

The radome for vehicles and its manufacturing method according to the present invention provides, among other, the following advantages:
Better RF performance by eliminating the air gap between first and second parts.
Better RF performance by reducing the total thickness when compared to the ones which use an intermediate thermoplastic part to join the first and second parts.
Performance improvement of the internal heating, by reducing the distance between the heating and the front face and eliminating the air gap without the need of positioning the heating elements on the front face, which would affect to the external appearance of the manufacturer's emblem.

Avoid the damage on the metal looking decoration layer caused by injection of intermediate thermoplastic without the need of protecting parts or layers.

Improvement of adhesion of the intermediate part to the metal looking layer without adding adhesion substances.

Optimization of integrated manufacturing process when an injected thermoset for the intermediate part and for the front protective is adopted, reducing the environmental impact associated to air spraying varnishes with solvents.

Reduction of tight tolerances required for a three-dimensional emblem when an adhesive solution between the first and the second part is used.

BRIEF DESCRIPTION OF THE SEVERAL VIEWS OF THE DRAWING(S)

For a better understanding of what has been stated, some drawings are attached in which, schematically and only as a non-limiting example, a practical case of embodiment is represented.

DESCRIPTION OF SPECIFIC EMBODIMENTS OF THE INVENTION

Figure 1:
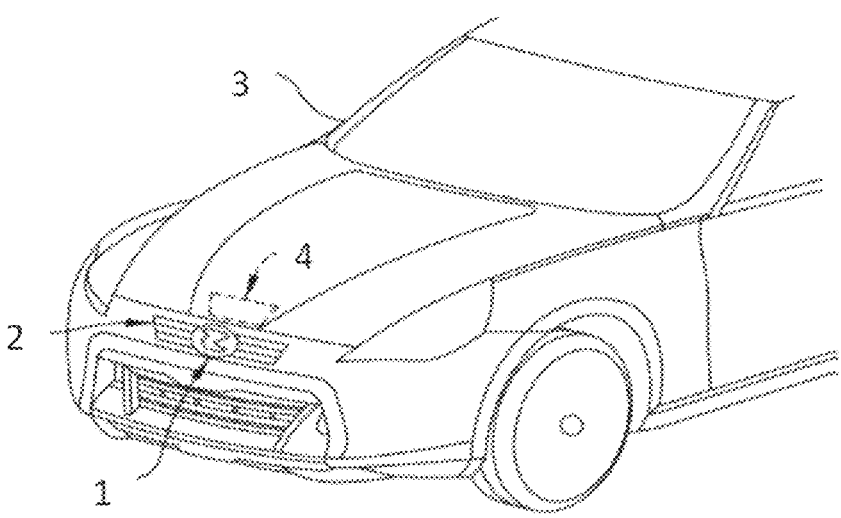
FIG. 1 is a fragmentary isometric view of the vehicle having a radome constructed in accordance with and embodying the invention positioned within a grill assembly and a radar antenna positioned behind the radome.

With reference now in detail to the drawings, wherein like numerals will be employed to denote like components throughout, as illustrated in FIG. 1, the reference numeral 1 denotes generally a decorative radome constructed in accordance with and embodying the invention configured for mounting within a grill assembly 2 of a motor vehicle 3.

Positioned within a vehicle 3 behind and in registration with the decorative radome 1 is a radar antenna 4.

Figure 2:
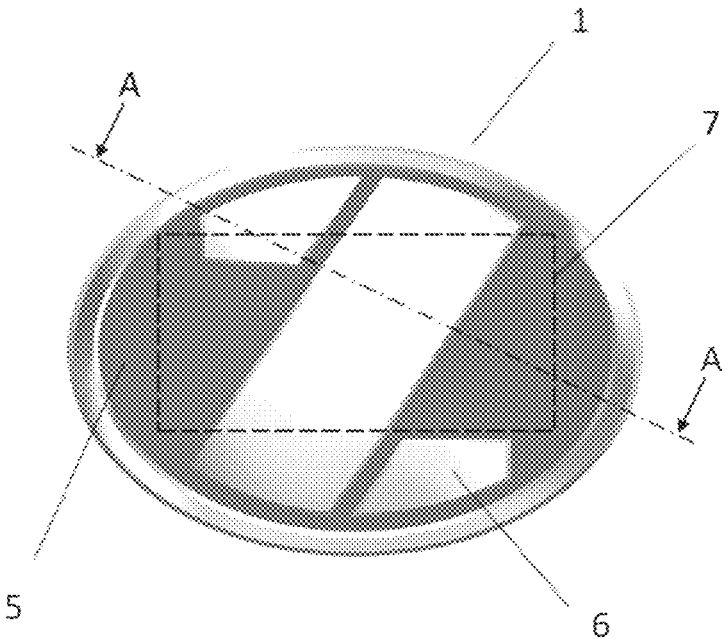
FIG. 2 is a front view of the radome, where a manufacturer's emblem may be identified by contrast of colored and metal looking areas.

FIG. 2 shows a front view of the radome 1, where it is visible a colored decoration layer 5 and a metal looking decoration layer 6 which represent, for instance, the manufacturer's emblem. It keeps high transmittance performance for the signal emitted and received by the protected radar antenna 4 in a field of view 7, defined by the discontinuous line.

In general, applicable to all the figures, the thickness of the different layers is not to scale because the relation between them may be of orders of magnitude. Front face or surface of one component shall be understood as its face closer to an external observer in front of the radome at the exterior of the vehicle while rear face or surface of a component will be understood as its face closer to the radar 4.

First Embodiment

Figure 3:
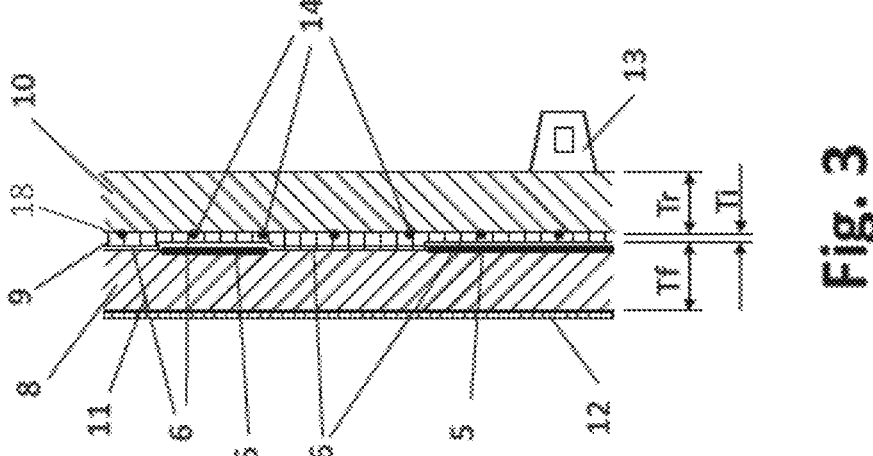
FIG. 3 is a schematical cross section according to A-A on FIG. 2, showing a first embodiment with the rear face of the first part and front face of second part substantially flat.

In the following, a first embodiment of the radome with an intermediate part 9 made from a thermoset compound is described with reference to FIG. 3.

This embodiment corresponds to the cross section according to A-A on FIG. 2 and is able to provide an emblem with a two-dimensional appearance. It is representative of the field of view 7 and may also represent areas out of it.

A first part 8, which is preferably frontal, an intermediate part 9, which is preferably thermoset, and a second part 10, which is preferably rear, are represented. The first part 8 faces the exterior side of the vehicle 3 while the second part 10 faces the radar.

The first part 8 is formed by a front transparent layer 11, the colored decoration layer 5, the metal looking decoration layer 6 and, optionally, a protective layer 12.

The front transparent layer 11 is made of a material with high transmission capability to both the visible light and the signal emitted and received by the protected radar 4.

It may be made of a thermoplastic resin like Polycarbonate (PC) and may be obtained by injection molding or being a laminated foil of the same material.

The colored decoration layer 5 provides opacity to the visible light while maintaining a high degree of transmission of the signal emitted and received by the protected radar 4. It partially covers the rear face of the transparent layer 11, leaving some uncovered areas. It may be obtained by printing a decorative ink on the rear face of the transparent thermoplastic layer 11, which has been produced by any of its mentioned manufacturing methods. This printing process requires the usage of a mask to leave some uncovered areas. It may also be obtained by foil transfer or hot stamping.

Alternatively, the colored decoration layer 5 may also be obtained by injection molding in a manufacturing combined molding process with the transparent layer 11, using some non-transparent compatible material. The colored decoration layer 5 is represented on the rear face of the transparent layer 11. However, it may be located on its front face.

The metal looking decoration layer 6 is deposited on the rear face (closer to the radar 4) of the set formed by the transparent layer 11 and the colored decoration layer 5. The metal looking decoration layer 6 may be seen by an external observer through the uncovered areas left by the colored decoration layer 5. The combination of opaque areas of the colored decoration layer 5 and the metal looking decoration layer 6 generates an emblem that may be clearly seen by the external observer as shown on FIG. 2.

The metal looking decoration layer 6 provides a bright appearance thanks to the usage of metals, metalloids and or oxides as described in extensive literature. In any case, it must ensure high electrical resistivity to reduce the attenuation caused to the signal emitted and received by the protected radar 4. This thin and controlled thickness layer may be deposited, for instance, by a Physical Vapor Deposition (PVD) magnetron sputtering process or by a Plasma Enhanced Chemical Vapor Deposition (PECVD) process, or others, depending on the composition of the layer.

Depending on the characteristics of the materials used, the first part 8 may require a protective layer 12 on its front face. The protective layer 12 may be a varnish applied by an air spray method or a polyurethane or polyurea thermoset resin applied, for instance, by a Reaction Injection Molding process (RIM).

The second part 10 usually includes fixations 13 to the grill assembly 2 (or to other parts of the car). In some cases, the radome provides a heating function to remove the ice or snow that may be present on the front face of the radome. This function may be performed by a heating layer 18 on the front face of the second part 10. The heating layer 18 may be formed by heating elements 14 that are embedded on the front face of said second part 10. An electrical connector, not shown, can also be present at the rear face of the second part 10 to be connected to the power supply from the vehicle.

The second part 10 is made of a material with high transmission capability to the signal emitted and received by the protected radar 4 and which shows good chemical resistance and good mechanical properties for its fixation purposes. It may be obtained by injection molding of, for instance, Acrylonitrile Butadiene Styrene (ABS) or a blend of Polycarbonate and Acrylonitrile Butadiene Styrene (PC/ ABS).

The intermediate part 9 joins the first part 8 and the second part 10, entirely filling the space between the rear face of the first part 8 and the front face of the second part 10 and eliminating air gaps between them.

The material of the intermediate part 9 is a polyurethane resin (PUR) or a polyurea resin. They are applied, for instance, by a Reaction Injection Molding process (RIM). This process is different of the thermoplastic injection molding, where high temperatures and pressures are applied. The Reaction Injection Molding mixes two components and the chemical reaction between them forms a solid compound.

The manufacturing of the radome according to the present invention may consist in inserting both the first part 8 and the second part 10 in a mold and injecting the thermoset compound between them.

The extremely low viscosity of these compounds allows to use injection temperatures typically as low as 65° C. and always below 100° C. compared to 280° C.-320° C. for Polycarbonate or 200° C.-238° C. for Acrylonitrile Butadiene Styrene or some intermediate values for PC/ABS. The injection pressures for these compounds are typically in the range of 2-6 MPa and always below 40 MPa compared to the 80 MPa-120 MPa of Polycarbonate or the 60 MPa-150 MPa for the ABS or some intermediate values for PC/ABS.

This extreme low viscosity allows to obtain very thin internal walls on typical radome dimensions. The minimum thickness Ti of the intermediate part 9 between the rear face of the first part 8 and the front face of the second part 10 made with these compounds may be as low as 0.1 mm compared to not less than 1.0 mm (usually between 1.0 mm and 3.0 mm) that would be required for one of the typical mentioned thermoplastic components.

In order to minimize the radiofrequency (RF) reflection of the radomes, they are designed targeting a total thickness (Tf+Ti+Tr on FIG. 3) being a multiple of lambda/2, where lambda is the wavelength of the signal emitted and received by the radar 4.

Additionally, the reduction of total thickness in steps of lambda/2 reduces the RF attenuation of the radome.

Using the proposed thermoset resins allows to reduce the total thickness by one or more times lambda/2, resulting in an improvement of RF attenuation performance of the radome.

These thermoset compounds may be formulated to show a dielectric constant similar to the ones of the thermoplastic materials (about 2.7 or 2.8) of the first part 8 and the second part 10. This results in an improvement of the RF performance when compared with radomes having an air gap, where the dielectric constant of air is 1.0.

The mentioned applied low injection temperature and pressure does not damage the metal looking decoration layer 6. Furthermore, thermoset resins show good adhesion to the materials of the decoration layer 6. Based on this, there is no need for neither any expensive mitigation or suppression member nor an anticorrosion layer nor an adhesion promoter layer that are required for other solutions where a thermoplastic material is injected as a junction element.

When using a thermoplastic resin for this purpose, the injection parameters are brought to the limits of a feasibility range to avoid damages to the metal looking decoration layer 6, resulting in a very narrow manufacturing window and low reliability process.

The heating function in a radome may be provided by a heating layer positioned on the front face of the first part 8. This shows optimal heating performance since the snow or ice are deposited on this face. However, the heating elements may be seen by an external observer, damaging the perceived image of the emblem and being not acceptable by the car manufacturer.

In order to avoid this, the heating layer 18 is positioned on the front face of the second part 10 and is hidden to an external observer by the colored decoration layer 5 and the metal looking layer 6. The heating layer 18 may consist of a dielectric foil containing heating elements 14 or consist of heating elements 14 directly positioned on the front face of the second part 10. The heating elements 14 are electrically powered and they may consist in conductive heating wires.

Some vehicle manufacturers specify the heating performance of the radome in terms of how much time is needed to achieve a certain temperature on a given area percentage of the surface of the front face of the radome.

The usage of Polyurethane or Polyurea as intermediate part 9 also provides improvements in terms of heating performance, compared to thermoplastic materials of the Prior Art.

The reduced thickness due to the lower viscosity of the proposed thermoset materials has the effect of reducing the distance between the heating layer 18 and the front face of the radome. This improved design reduces the transition time to transfer the heat from the heating layer 18 to the front face of the radome.

Additionally, these materials show some better thermal conductivity (about 0.24 W/mK), compared to the one of the usual thermoplastic materials (about 0.20 W/mK). Their thermal conductivity is also much better of the one of a potential air gap (about 0.026 W/mK).

Figure 6:
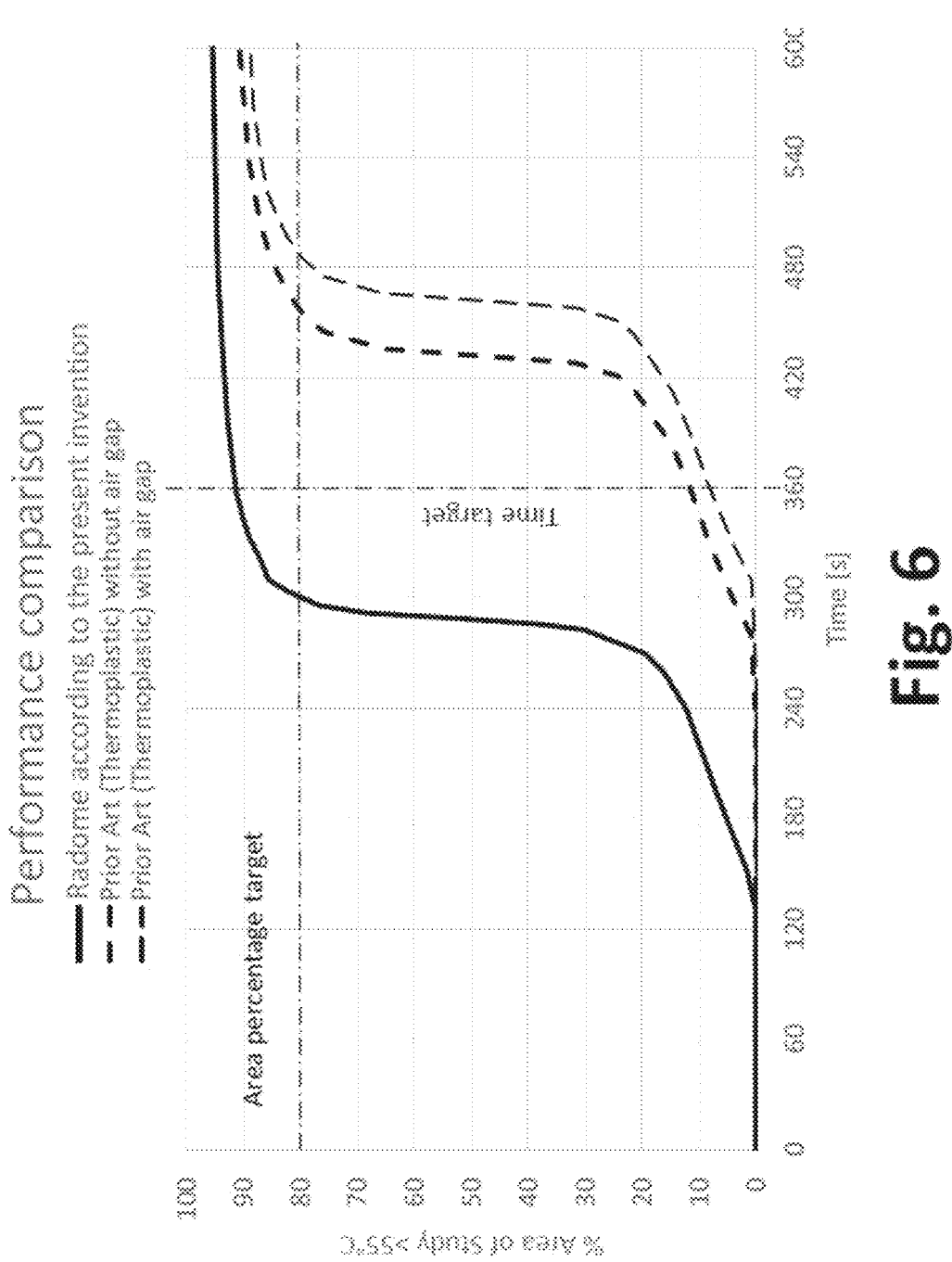
FIG. 6 is a graph with a heating performance comparison between the proposed concept and Prior Art.

The graph on FIG. 6 shows the simulation results of heating performance where the specified surface temperature is 55° C. and the dash-dotted lines show the specified area percentage (80%) and the specified maximum time (360 s) to achieve it.

It may be seen that the Prior Art based on an intermediate part made of thermoplastic with air gap (thin dash-dotted line) or without air gap (thick dash-dotted line) are not able to pass the requirement.

The proposed concept (thick solid line) passes the requirement because combines the effects of thinner thickness, improved conductivity and elimination of air gap.

Furthermore, a minimum thickness Ti of the intermediate part 9 of 0.1 is enough to cover the heating elements 14 that may be protruding from the second part 10 if they are directly positioned on its front face, avoiding any contact with the metal looking layer 6, which might be affected by long-term effects of the heat dissipated by the heating elements 14 in direct contact.

This protection would not be provided by an adhesive, which might be considered as an alternative to disclosed intermediate part 9. Adhesive thicknesses are usually lower and, if thicker thicknesses would be applied, their usual significantly different dielectric constant when compared to the thermoplastic materials used on the radome, would decrease the RF performance.

Since RIM is the process adopted for the intermediate part 9 and is an optional process for the protective layer 12, it might be considered to combine them as a two-step process. The first part 8 and the second part 10 would be inserted in the mold, the intermediate part 9 would be injected in a first step and the protective layer 12 in a second step without the need of removing any part from the mold to apply the protective layer 12.

The result would be an optimized manufacturing process with environmental lower impact due to the absence of the solvents of a classical air spray method with a varnish.

Second Embodiment

Figure 4:
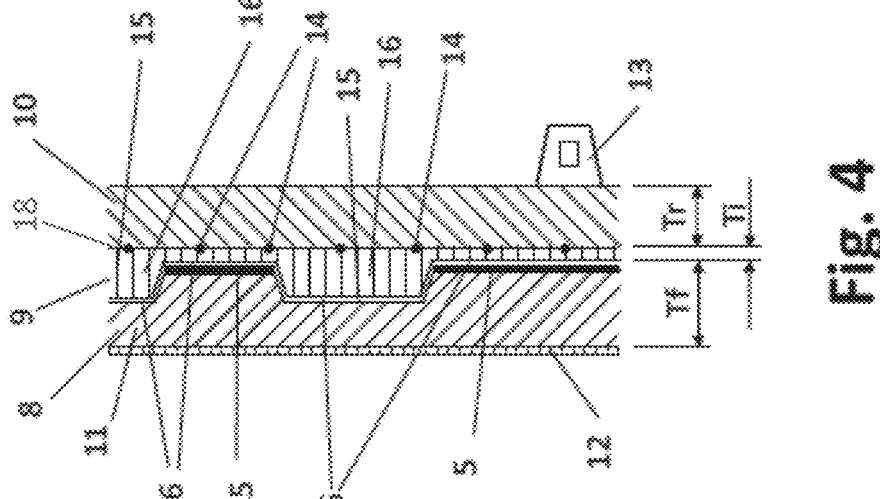
FIG. 4 is a schematical cross section according to A-A on FIG. 2, showing a second embodiment with the rear face of the first part not substantially flat, providing a three-dimensional appearance of the emblem and front face of second part substantially flat.

In the following, a second embodiment of the radome with intermediate part 9 is described with reference to FIG. 4.

In the second embodiment, identical reference numerals are given to the components that are quite similar to the corresponding components of the first embodiment and redundant description is omitted therein.

This embodiment corresponds to the cross section according to A-A on FIG. 2 and is able to provide an emblem with a three-dimensional appearance. It is representative of the field of view 7 and may also represent areas out of it.

In this second embodiment, the transparent layer 11 shows some depressions 15 on its rear face. In this case, the transparent front layer 11 is obtained by injection molding.

The colored decoration layer 5 of this second embodiment covers the rear face of the transparent layer 11 which does not have the depressions 15. It may be obtained by printing a decorative ink on the not depressed rear face of the transparent thermoplastic layer 11 It may also be obtained by foil transfer or hot stamping.

Alternatively, the colored decoration layer 5 may also be obtained by injection molding in a manufacturing combined molding process with the transparent layer 11, using some non-transparent compatible material.

The metal looking decoration layer 6 of this second embodiment also follows the profile of the set formed by the transparent layer 11 and the colored decoration layer 5, including the depressions 15, providing a three-dimensional appearance to the represented emblem.

The optional protective layer 12 of this second embodiment may be of the same materials and manufacturing processes than in the first embodiment.

The second part 10 of this second embodiment has the same characteristics as the described for the first embodiment.

The intermediate part 9 of this second embodiment, which joins the first part 8 and the second part 10, shows a very much variable thickness. It includes some intermediate protrusions 16 on its front face which fill the depressions 15, avoiding the existence of air gaps that might decrease the RF performance.

The material characteristics and manufacturing process for the intermediate part 9 of this second embodiment are the same as the ones described for the first embodiment.

The heating layer 18 formed by the heating elements 14 is at the same position as in the first embodiment, offering the same advantages in terms of heating performance when compared with prior art with thermoplastic for the intermediate part with or without air gap between the first part 8 and the second part 10.

This second embodiment would not be feasible by using an adhesive because they would not be able to provide the thickness of the intermediate protrusions 16 (about 1 mm or more). If provided, they would decrease the RF performance because of its different dielectric constant.

Same optimized manufacturing process described on first embodiment would be applicable.

Third Embodiment

Figure 5:
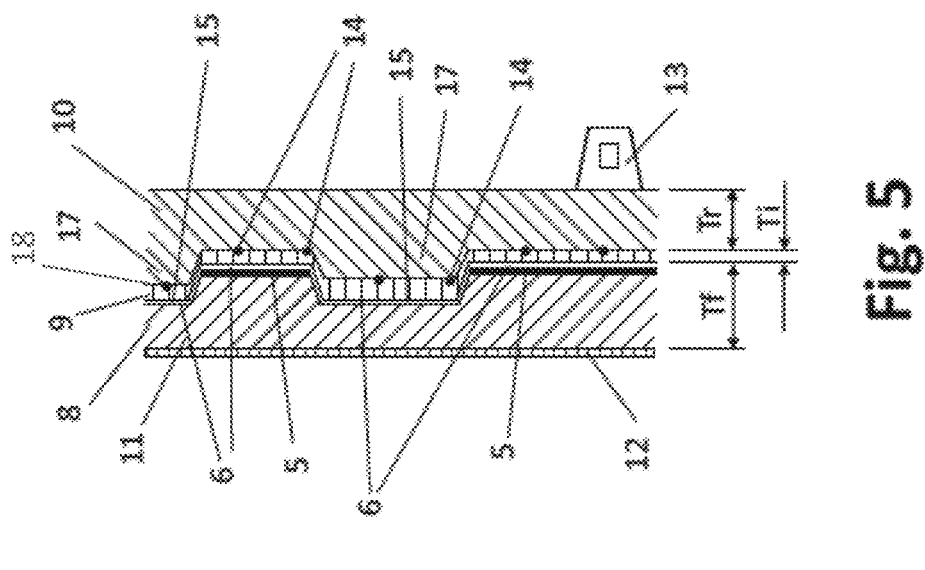
FIG. 5 is a schematical cross section according to A-A on FIG. 2, showing a third embodiment with the rear face of the first part and front face of second part substantially not flat.

In the following, a third embodiment of the radome with intermediate part 9 is described with reference to FIG. 5.

In the third embodiment, identical reference numerals are given to the components that are quite similar to the corresponding components of the first and second embodiments and redundant description is omitted therein.

This configuration corresponds to the cross section according to A-A on FIG. 2 and is also able to provide an emblem with a three-dimensional appearance. It is representative of the field of view 7 and may also represent areas out of it.

The characteristics of the components of the first part 8 of this third configuration are the same as those of the second embodiment.

The second part 10 of this third embodiment includes some rear protrusions 17 which partially fill the depressions 15.

The intermediate part 9 of this third embodiment also joins the first part 8 and the second part 10, filling all the space between the rear face of the first part 8 and the front face of the second part 10, avoiding the existence of air gaps that might decrease the RF performance.

Since the rear protrusions 17 only partially fill the depressions 15, the thickness of the intermediate part 9 shows some variabilities in its thickness as may be seen on the figure.

This capability of the thermoset material to adopt different thicknesses avoids the need of a precise match between the first part 8 and the second part 10 if an adhesive solution would be adopted.

This third embodiment would not be feasible using an adhesive because it would not be able to provide this variable thickness, resulting in some local air gap.

The material characteristics and manufacturing process for the intermediate part 9 of this third embodiment are the same as the ones described for the first and second embodiments.

The heating layer 18 formed by heating elements 14 is at the same position as in the first and second embodiments, offering the same advantages in terms of heating performance when compared with prior art with thermoplastic for the intermediate part with or without air gap between the first part 8 and the second part 10.

Same optimized manufacturing process described on first embodiment would be applicable.

Despite the fact that reference has been made to a specific embodiment of the invention, it is clear to a person skilled in the art that the described radome for vehicles and its manufacture method are susceptible to numerous variations and modifications, and that all the mentioned details can be substituted by others technically equivalent ones, without departing from the scope of protection defined by the appended claims.

The invention claimed is:

1. A radome (1) for vehicles, comprising:
a first part (8) comprising a transparent layer (11), at least one decoration layer (5) and a protective layer (12), the protective layer (12) being made from a polyurethane or polyurea thermoset resin;
a second part (10) comprising a heating layer (18); and
an intermediate part (9) placed between the first and second parts (8,10), the intermediate part (9) being made from a polyurethane resin or polyurea resin,
wherein the intermediate part (9) joins the first part (8) and the second part (10), entirely filling the space between the rear face of the first part (8) and the front face of the second part (10).

2. The radome (1) for vehicles according to claim 1, wherein the radome (1) defines a field of view (7) in the first, second and intermediate parts (8, 10, 9), the intermediate part (9) being in contact with the first and second parts (8, 10) at least in said field of view (7).

3. The radome (1) for vehicles according to claim 1, wherein the thickness of the intermediate part in its part with a minimum thickness, Ti, is greater than 0.1 mm.

4. The radome (1) for vehicles according to claim 1, wherein the transparent layer (11) comprises depressions (15).

5. The radome (1) for vehicles according to claim 1, wherein the intermediate part (9) comprises intermediate protrusions (16) with a thickness greater than the rest of the intermediate part (9).

6. The radome (1) for vehicles according to claim 4, wherein the second part (10) comprises rear protrusions (17) complementary with the depressions (15) of the transparent layer (11).

* * * * *